United States Patent

Neville, Sr.

Patent Number: 6,095,388
Date of Patent: Aug. 1, 2000

[54] VEHICLE UMBRELLA HOLDER

[76] Inventor: Roland J. Neville, Sr., 830 Highway 44, Reserve, La. 70084

[21] Appl. No.: 09/390,752
[22] Filed: Sep. 7, 1999
[51] Int. Cl.⁷ ..................................................... B60R 7/12
[52] U.S. Cl. ......................... 224/556; 224/566; 224/275; 224/915; 211/62
[58] Field of Search ................................ 224/915, 556, 224/564, 566, 482, 275; 211/62, 63; 135/34.2; D12/425

[56] References Cited

U.S. PATENT DOCUMENTS

| | | | |
|---|---|---|---|
| 1,585,551 | 5/1926 | Katz | 224/566 |
| 3,124,287 | 3/1964 | Belzer | 224/29 |
| 4,378,888 | 4/1983 | Reed | 211/63 |
| 4,723,748 | 2/1988 | McCarty | 248/311.2 |
| 4,795,067 | 1/1989 | Hamilton | 224/915 |
| 5,046,662 | 9/1991 | Cowles | 229/157 |
| 5,584,403 | 12/1996 | Sipperly | 211/63 |
| 5,709,328 | 1/1998 | Ackeret | 224/282 |

Primary Examiner—Linda J. Sholl
Attorney, Agent, or Firm—Henderson & Sturm LLP

[57] ABSTRACT

A vehicle umbrella holder comprising a plastic member providing an elongated half round tray into which an umbrella can be positioned. The tray is shaped to conform to a removable open celled absorbent sponge liner that is attachable to the interior facing surface of the tray and which can absorb water dripping from the umbrella. A pair of attachment tabs extend outward from the tray structure and are adapted to be inserted between the back of the seat and the rear deck.

4 Claims, 1 Drawing Sheet

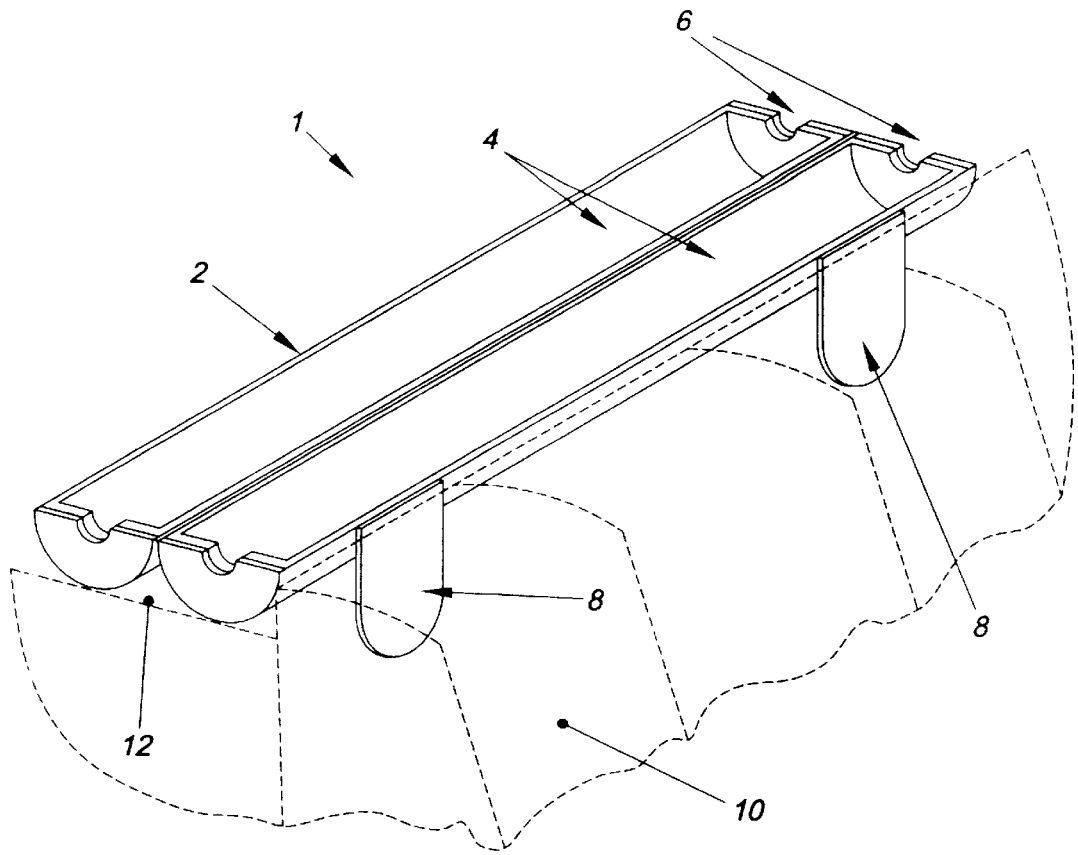
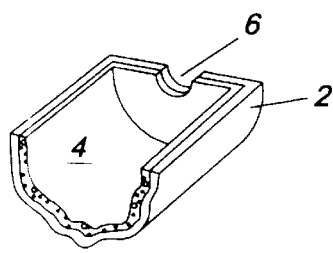
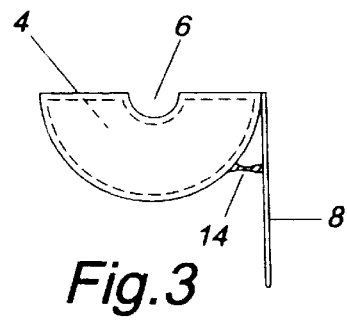
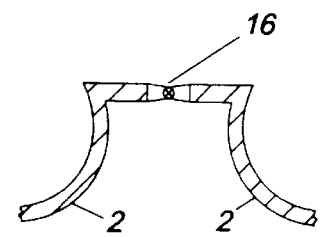

VEHICLE UMBRELLA HOLDER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the field of vehicle accessories, and more particularly to an umbrella holder for vehicles.

2. Description of the Related Art

As can be seen by reference to the following U.S. Pat. Nos. 3,124,287; 4,378,888; 4,723,748; 5,046,662; 5,709,328; and 5,584,403 the prior art is replete with myriad and diverse umbrella holders and storage devices.

While all of the aforementioned prior art constructions are more than adequate for the basic purpose for which they have been specifically designed, they are uniformly deficient with respect to their failure to provide a simple, efficient and practical vehicle umbrella holder.

As a consequence of the foregoing situation, there has existed a need for a new and improved vehicle umbrella holder and the provision of such a construction is a stated objective of the present invention.

BRIEF SUMMARY OF THE INVENTION

Briefly stated, the present invention provides a vehicle umbrella holder comprising a plastic member providing an elongated half round tray into which an umbrella can be positioned. The tray is shaped to conform to a removable open celled absorbent sponge liner that is attachable to the interior facing surface of the tray and which can absorb water dripping from the umbrella. A pair of attachment tabs extend outward from the tray structure and are adapted to be inserted between the back of the seat and the rear deck.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the vehicle umbrella holder of the present invention suitable for holding two umbrellas, with a dashed line showing of the vehicle seat and rear deck;

FIG. 2 is a partial perspective sectional view of one of the trays illustrating the removable absorbent liner attached to the interior facing surface of the tray;

FIG. 3 is an end elevational view of a tray and the attachment tab; and

FIG. 4 is a partial end sectional view illustrating the x-brace connection between two adjacent trays.

DETAILED DESCRIPTION OF THE INVENTION

As can be seen by reference to the drawings, and in particulary to FIG. 1, the vehicle umbrella holder that forms the basis for the present invention is designated generally by reference number (1). The umbrella holder (1) consists of a long, half round plastic trough or tray (2) having a small cut-out (6) at each end to accommodate an umbrella ferrule and/or the umbrella shank or handle when an umbrella is placed in the device. A removable foam or sponge-like liner (4) fits into the tray (2) so as to absorb any water which may run out of a wet umbrella. A pair of downward pointing plastic tabs (8) on each end allows the assembly to be securely affixed to the rear package tray area. The tabs (8) are inserted between the back of the seat (10) and rear deck (12). The umbrella holder (1) is manufactured to accommodate one, two, or more umbrellas, and may come in a variety of colors allowing the user to choose one closely matching the interior color of their automobile.

FIG. 3 illustrates a reinforcement web (14) of the alignment tab (8). A reinforcement web (14) such as this assists greatly in keeping the tab (8) from breaking apart from the outside surface of the tray (2) making it stronger without adding a lot of plastic. Also shown is the end view of the foam insert (4), which as mentioned previously, is removable from the tray (2).

FIG. 2 shows the removable absorbent foam liner (4) attached to the interior facing surface of the tray (2). FIG. 4 illustrates an "X"-brace connection point (16) between two, adjacent umbrella trays (2) when there is more than a single tray (2) involved. "X"-bracing (16) of this type provides a lightweight design that is extremely strong. This provides a connection between the two trays (2) that prevents "snapping apart" between the two units without using a large amount of plastic, a cost savings in product and tooling.

The design of the umbrella holder (1) is that of a plastic device which fits behind the rear seat (10) of an automobile allowing one or more umbrellas to be stored conveniently out of the way.

The trays (2) are formed of styrene plastic or polyethylene plastic and the removable absorbent liner (4) is formed of open-cell polyurethane foam.

In use, the user simply installs the umbrella holder (1) into their vehicle by inserting the alignment tab (8) between the rear deck (12) and rear seat (10). They would then enjoy the benefit of having a handy and convenient place to store their umbrella or umbrellas when not in use. The unique design of the tray (2) and removable form or sponge like liner (4) allows even wet umbrellas to be stored without danger of water getting onto the seat or vehicle occupants. In the event that an excess amount of water is absorbed by the liner (4), it can be easily removed allowing the water to be wrung out. Use of the umbrella holder (1) would provide a very practical and easy to use method of allowing anyone to more conveniently carry umbrellas in an automobile.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A vehicle umbrella holder, comprising:
    an elongated half round tray including opposing end sections, an interior facing surface, and an exterior facing surface;
    slots formed in each of the opposing end sections;
    a pair of attachment tabs attached to the exterior facing surface of the tray and disposed to extend downwardly therefrom; and a removable absorbent liner attached to the interior facing surface of the tray.

2. The vehicle umbrella holder of claim 1 further including reinforcement webs attached to and interconnecting the exterior facing surface of the tray and the attachment tabs.

3. The vehicle umbrella holder of claim 1 further including a plurality of side-by-side disposed adjacent trays.

4. The vehicle umbrella holder of claim 3 wherein the adjacent trays are interconnected by an x-brace connection.

* * * * *